United States Patent Office 3,591,406
Patented July 6, 1971

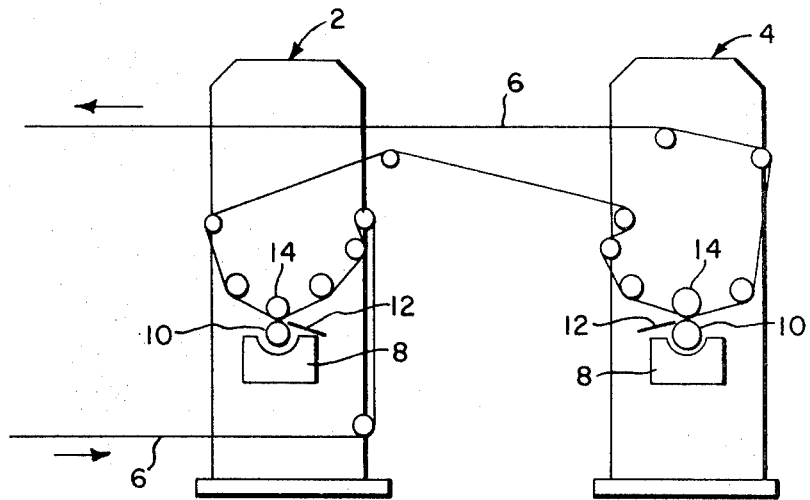

3,591,406
PROCESS FOR BAND-TINTING PLASTICIZED POLYVINYL BUTYRAL SHEETING AND PRODUCT THEREFROM
Robert E. Moynihan, Lowell, Ohio, assignor to E. I. du Pont de Nemours and Company, Wilmington, Del.
Continuation-in-part of application Ser. No. 766,070, Oct. 9, 1968. This application Oct. 17, 1969, Ser. No. 867,228
Int. Cl. B44d 1/24, 5/00
U.S. Cl. 117—37  2 Claims

ABSTRACT OF THE DISCLOSURE

Plasticized polyvinyl butyral sheeting is uniformly tinted without requiring normalization by depositing ink in a myriad of dots substantially coextensively on both sides of the sheeting. The myriad of dots can be in a band, and the resultant band-tinted sheeting is useful as safety glass interlayer.

---

This application is a continuation-in-part of U.S. patent application Ser. No. 766,070, filed Oct. 9, 1968, now abandoned, by the same inventor.

The invention relates to the plasticized polyvinyl butyral sheeting and more particularly, to a process for tinting the sheeting and to the resultant product.

Plasticized polyvinyl butyral sheeting is useful as the interlayer in laminated safety glass. It has become desirable to provide a tinted band in this sheeting so that safety glass made therefrom will have a built-in glare screen, such as along the upper edge of a windshield. The band is of uniform tone in the direction corresponding to the direction along the upper edge of the windshield, and in the perpendicular direction grades uniformly to the tone of the remaining part of the sheeting, so as to present a smooth transition of tone to the viewer.

Application of the tinted band to the sheeting by dipping or spraying techniques has not received commercial acceptance. While application of the band by printing on one side of the sheeting has been practiced commercially, printing has the drawback of requiring heating of the sheeting, as described in U.S. Pat. No. 2,739,080 to Woodworth, at 60° C. for at least three days, or equivalent heat treatment, in order for the dye to diffuse to a uniform tone. This heating is called normalizing. The tinted band as heretofore printed in the form of a myriad of dots of ink on one side of the sheeting has been characterized by some of the dots of ink running together or agglomerating to produce a mottled effect. Normalizing has enabled this non-uniform tone as printed to be made uniform by extensive diffusion of the dye along the surface of the sheeting, and into the sheeting to tint the opposite side thereof.

Normalizing, however, has its disadvantages, namely, of the added expense required and the tendency of the sheeting to change in dimension and color. In addition, for space economy purposes, the sheeting must be stacked or reeled after printing, such as during normalizing and handling, which leads to contact between the dyed and undyed sheeting surfaces. During such contact, the dye from the dyed surface of the sheeting tends to migrate non-uniformly to the undyed surface in contact therewith to produce discoloration thereof, which can be called transfer mottling. Anti-blocking agents such as $NaHCO_3$ powder have been applied to the sheeting surface to prevent transfer mottling but with only limited success. Moreover, the use of such agents has the disadvantage of the agent having to be removed, such as by washing prior to lamination, followed by drying to moisture levels required for lamination.

The present invention provides a process for forming a tinted band on plastic sheeting, e.g., plasticized polyvinyl butyral sheeting, which is useful as the interlayer in safety glass, wherein normalization is not required in order to get the tone uniformity desired, and wherein transfer mottling does not occur. The process is conducted by depositing about equal amounts of ink in the form of a myriad of dots in the band desired substantially coextensively on both sides of the sheeting, instead of the single side as practiced by the art heretofore. Such operating variables as the spacing between the dots of ink, the quantity of ink deposited, and the ink viscosity, volatility and wetability for the sheeting surface are controlled as will be hereinafter described, such that the dots essentially maintain their discreteness as deposited, i.e., agglomeration of the dots does not occur. Thus, the tone uniformity desired is essentially produced by the depositing step, which alleviates the need for normalizing. Some small amount of diffusion of the dye into the sheeting does occur during handling, but the gross amount of diffusion required to even out the degree of mottling hereinbefore obtained, which has led to the use of normalization, is not needed. The small amount of diffusion occurring during handling of sheeting processed according to the present invention is the same, i.e., the time available for diffusion is the same, as would occur during handling of normalized sheeting after normalization.

The resultant sheeting of the present invention has the tinted band on both sides rather than the single side heretobefore used. Thus, when this sheeting is stacked with the tinted band in register with other tinted bands, there is no undyed surface in contact with a dyed surface to lead to transfer mottling. The tendency of transfer mottling to occur is further minimized by the concentration of dye in the dyed surfaces in contact with one another being about equal. The need for powdering to combat transfer mottling is thereby eliminated. Another advantage of the resulting sheeting is the appearance quality of the tinted band, which is better than that of normalized, conventional single-side printed sheeting. Preferably, the sheeting after printing is stored under refrigeration at temperatures from 30 to 50° F. When the sheeting is stored at ambient temperature, powdering of the sheeting is generally required to prevent the sheeting from sticking to one another.

The present invention will be more fully described hereinafter with reference to the drawing, which shows in schematic side elevation apparatus for band-tinting both sides of plasticized polyvinyl butyral sheeting. The apparatus comprises a pair of rotogravure printing presses 2 and 4 spaced apart and through which a continuous sheet 6 of plasticized polyvinyl butyral (shown edgewise) successively passes as shown. Each press has an ink reservoir 8, an engraved printing cylinder 10 dipping into its respective ink reservoir, a doctor blade 12, and an impression roll 14. The printing cylinder of press 2 operates against its impression roll to deposit a band of a myriad of dots of ink along one edge of one side of the sheeting and press 4 does the same operation along the same edge on the opposite side of the sheeting to produce a band which is coextensive with the first printed band. The ink dries between presses. The resultant band-tinted sheeting can be shipped without normalizing and can be immediately used to produce satisfactory laminated safety glass.

The printing presses 2 and 4 are conventional rotogravure printing presses. The printing cylinders of each press are engraved along one edge of their printing surface with recesses which define the shape, size, and spacing of the printed myriad of dots and the quantity of ink deposited. Contrary to present practice of using a very fine design of dots, which leads to mottling, the dot pattern used herein is only moderately fine (e.g., 100 to 150 dots per linear inch), in the sense of spacing between the dots so as to essentially maintain as-printed dot discreteness, and the recess volume in the cylinder is relatively small so as to reduce ink pick-up from the reservoir.

By reducing the recess volume in the direction away from the edge of the cylinder, a band which is uniform in tone in the machine direction and of uniformly diminishing tone in the perpendicular direction is obtained, which is suitable for use as the graded-band glare screen for automobile windshields. The present invention is not limited to producing gradient bands; however, by proper engraving of the printing cylinder the band can be made to cover the entire sheeting, or any portion thereof desired, and can be of either even or gradient tone.

The present invention is not limited to gravure printing of the band on both sides of the sheeting. Other methods of depositing a myriad of dots on both sides to get the tinted band of the uniform tone desired without normalizing can be used. For example, relief printing and planographic (offset) printing can be used. To aid in tinted-band fade-out the tinted band on one side of the sheeting can extend slightly beyond the tinted band on the opposite side.

The plasticized polyvinyl butyral sheeting as used herein is a well-known article of commerce. Generally, it comprises from 25 to 35 percent by weight of plasticizer, such as dibutyl sebacate, triethylene glycol di-2-ethylbutyrate, or dibutyl Cellosolve adipate, and the remainder resin composed of 16 to 25 percent by weight of hydroxyl groups, calculated as polyvinyl alcohol, less than three percent by weight of acetate groups, calculated as polyvinyl acetate, and the balance, 72 to 84 percent by weight of polyvinyl butyral. The sheeting can have an alkaline titer, such as between 60 and 200, U.S. Pat. No. 3,231,461 to Mattimoe, which patent is incorporated herein by reference.

The surfaces of the plasticized polyvinyl butyral sheeting are roughened prior to printing, for the purpose of promoting de-airing between the sheeting and glass sheets during lamination. This surface roughness or unevenness can be obtained by such techniques as embossing, chemical treatment (U.S. Pat. Nos. 2,360,712 and 2,360,650), extrusion embossing (British Pat. No. 944,686) which give random pattern matte surfaces or by such process as extrusion through serrated dies to give regular serrated surfaces. The sheeting preferred for use in the present invention has a random surface pattern characterized by a surface profile, as measured with a Rank-Taylor-Hobson Talysurf 4, having a Center Line Average Deviation (CLA) of from 20 to 200 microinches (sensitivity J), and preferably from 140 to 175 microinches. The surface roughness can also be characterized by measuring the rate of air flow between the sheeting surface and a polished metal plate using a smoothness tester (W. and L. E. Gurley Co.). A Gurley gage of 4.5 to 1 min. per 10 cc. corresponds to the typical range of roughness for good de-airing. The particular printing conditions employed according to the present invention will vary with and depend on the character of the surface of the sheeting being printed.

The ink used in this invention generally comprises organic solvent solution of dye and polyvinyl butyral. The dye should be colorfast in the sheeting and soluble in the particular solvent used in the ink. Suitable dyes and solvents include those disclosed in U.S. Pat. No. 2,739,080 to Woodworth, which is incorporated hereby by reference; other dyes meeting the light stability and solubility requirements can be used. Some degree of diffusibility of the dye into the sheeting is desired, the diffusibility being such that the dye will diffuse on the order of half the distance from dot-to-dot rather than surface-to-surface, as required by single-side printing. The relatively small degree of diffusion needed for dyes used in the present invention is achieved during normal handling between sheeting manufacture and lamination, which can be short, as little as three days or less at room temperature or equivalent time-temperature exposure. Generally, the suitable dyes fall within the group of azo and anthraquinone dyes. Other solvents can be used so long as they will dissolve the dye selected and the amount of polyvinyl butyral to be used in the ink. The solvent should also be chemically inert to these materials as well as to the sheeting, and should have sufficiently high surface tension so as to not spread out on the uneven surface of the sheeting and cause agglomeration. The solvent should also have high volatility so as to dry as rapidly as possible in order to prevent the dots of ink from agglomerating.

The dye concentration in the ink will generally be from 4 to 10 percent by weight based on the weight of the ink. The polyvinyl butyral is present in the ink to increase its viscosity, and generally is present in a concentration of from 4 to 8 percent by weight, based on the weight of the ink. Preferably, the ink viscosity is from 150 to 220 c.p.s. The high viscosity and surface tension of the ink together with the high volatility of the solvent tend to prevent the ink from spreading out on the uneven sheeting surface after deposition. In addition, the recess volume of the printing cylinder is such that less ink per press (about one-half as much) is used than for single-side printing. This reduced amount of ink together with high ink viscosity, surface tension and volatility enables the myriad of dots to be close enough together to provide uniform tinting and yet remain essentially unagglomerated. While the reduced amount of ink deposited on one side of the sheeting produces a tinting which is too light, the presence of the coextensive band on the opposite side of the sheeting complements the tinting to get the tone (light transmission) desired.

These criteria for the selection of operating variables differ markedly from printing hereinbefore, which tended towards using a finer pattern of dots (closer spacing) and ink which tended to spread because of being used in much greater amounts and of lower viscosity. Normalizing had to be used to cure the printing defects resulting from such prior practice, whereas the present invention obviates the need for normalizing.

Lower viscosity inks can be used when conditions of printing are such that mottling is minimized or avoided. In this respect, the deposition of about one-half as much dye on one side as compared to single-side printing heretofore plays an important role in minimizing the tendency of mottling to occur from printing. In addition, the presence of dye on both sides of the sheeting tends to mask the slight mottling that may occur from using low viscosity inks, e.g., 90 c.p.s. In any event, such slight mottling is much less than the mottling obtained heretofore (which required normalization) and does not require normalization to be commercially acceptable.

The foregoing description of the practice of the present invention, although made with sole reference to plasticized polyvinyl butyral sheeting is applicable to any plastic sheeting which is useful for interlayer in safety glass. Thus, for example, the sheeting need not be entirely of plasticized polyvinyl butyral but instead need only comprise the surfaces of a composite sheeting wherein the core is for example unplasticized polyvinyl butyral. This composite sheeting is described in U.S. Pat. No. 3,437,552 to Bowen which is incorporated herein by reference. Alternatively, the plastic sheeting can comprise a transparent polyurethane either in the entirety or as the surfaces of composite sheeting, wherein the core is for example polycarbonate or unplasticized polyvinyl butyral, as described in U.S. Pat. No. 3,458,388 to Moynihan and U.S. Pat. No. 3,388,032 to Saunders, which patents are incorporated herein by reference. Additional examples of polymers from which plastic sheeting to be printed according to the present invention can be made include the ionic-hydrocarbon copolymers described in U.S. Pat. No. 3,264,272 to Rees, the polyamides described in U.S. Pat. No. 3,447,999, the ethylene/acrylic acid copolymers described in British Pat. No. 1,154,620, the vinyl chloride polymers described in German Pat. No. 1,421,142, and the mixed polymer of the vinyl ester of acrylic acid and methyl methacrylate described in German Pat. No. 1,292,811, which patents are incorporated herein by reference. The polyvinyl butyral based printing inks previously described herein are generally applicable to the non-polyvinyl butyral-containing sheeting. However, to promote diffusion of the dye into the sheeting, the polyvinyl butyral components of the ink may be replaced by the polymer from which the sheeting is made and the solvent selected to dissolve such polymers as well as the dye employed.

The following examples are illustrative of the present invention and are not intended as a limitation on the scope thereof. Parts and percents are by weight unless otherwise indicated.

EXAMPLE 1

A printing ink was prepared by dissolving:

| | Parts |
|---|---|
| Du Pont Oil Blue A (solvent blue 38) | 1.90 |
| Interchem Acetate Violet R Base (violet No. 1) | 2.96 |
| Plasto Yellow MGS (solvent yellow 40) | 4.21 | in 100 parts of a solution of polyvinyl butyral in dimethylformamide wherein the polyvinyl butyral concentration was adjusted to give a viscosity of 90±5 centipoises at 25° C. (ink I). A similar ink was produced except that the solution viscosity was adjusted to 200 centipoises by increasing the polyvinyl butyral concentration (ink II).

To serve as a control, plasticized polyvinyl butyral sheeting (.030-inch thick) with the standard rough surface for de-airing (Gurley Gage 1.0–4.5) was printed on one side with ink I by rotogravure using a mechanically engraved cylinder which produced a gradient band along one edge of the sheeting. The depressions or cells in the cylinder were engraved with the proper volume to give ca. 5 percent transmission (Illuminant A) in the dark portion of the tinted band when the sheeting was laminated in heat absorbing glass. This sheeting was powdered with sodium bicarbonate and placed in a vault at 140° F., in roll form, to normalize the dyes. Samples were taken after printing and every 24 hours for 10 days during normalization and laminated.

Similar sheeting was printed using ink II as the printing ink by a rotogravure process in which both faces of the sheeting were printed in good register along one edge with a gradient band. The cell volume in the mechanically engraved cylinder was reduced so that the double printing gave ca. 5 percent light transmission through the dark part of the band. The sheeting was powdered and stored at ambient temperature. Samples taken soon after printing were laminated and compared, by viewing against a uniform white background, with the laminated samples of the control sheeting which were taken at the intervals of normalization noted above. The double-side tinted sheeting immediately after printing was equivalent in uniformity of tone, or lack of mottle, to the control sheeting which had been normalized for 5 to 7 days. The control sheeting was judged to be usable commercially only after 5 to 7 days of normalization.

Blanks, 12 inches x 18 inches, cut from the double-side printed sheeting, were washed free of powder, stacked in approximate register at 50° F. and examined for tone uniformity periodically. Even after 12 days, no unevenness due to non-uniform dye transfer was noted, illustrating that anti-block agents are not needed for the purpose of preventing transfer mottling.

The sheeting produced by the new process was of overall better quality in that 95 percent was graded in upper categories of commercially acceptable appearance as compared to only 50 percent of the sheeting produced by conventional one-side printing being graded in such top categories. Satisfactory safety glass was produced by laminating the sheeting of this invention between two glass sheets by conventional laminating techniques.

EXAMPLE 2

In the preceding example, improved results were obtained by increasing the space or "land" between recesses engraved into the printing cylinder from zero percent to about 25 percent, increasing the viscosity of the ink, and by decreasing the volume of the recesses engraved into the printing cylinder to about one-half of their original volume, as well as by printing a coextensive gradient band onto both sides of the sheeting instead of just on one side.

In the present example, the same ink as disclosed in the preceding example is used except that the total dye concentration was only one-half of that present in the ink of the preceding example and the polyvinyl butyral content was adjusted to give the ink a viscosity of 90±5 cps. The recess volume of the engraved printing cylinder was about the same as for the preceding example wherein normalizing was required, except that land between recesses amounted to 10 percent. The sheeting was printed coextensively on both sides, and the as-printed sheeting exhibited some but only slight mottle which was of such a minor degree that it disappeared during three days normal handling at room temperature before laminating with glass to form safety glass.

In the foregoing examples, the spacing of recesses in the engraved printing cylinder were the same, about 125 recesses per linear inch in the dark portion of the printed tinted band, with the variation in land between recesses being obtained by changing the width of the recesses.

In this specification, the viscosities stated are at 25° C.

As many apparently widely different embodiments of this invention may be made without departing from the spirit and scope thereof, it is to be understood that this invention is not limited to the specific embodiments thereof except as defined in the appended claims.

What is claimed is:

1. A process for tinting plastic sheeting which is useful as interlayer for safety glass, comprising depositing ink in the form of a myriad of dots substantially coextensively on both sides of the sheeting, with the amount of ink deposited on one side of said sheeting being insufficient by itself to provide the tone desired but complementing the amount of ink deposited on the opposite side of said sheeting to produce said tone desired, and with the spacing of said dots and the quantity of said ink and its viscosity, volatility and surface tension being such as to provide uniform tinting while avoiding agglomeration; and obtaining as a result thereof tinted sheeting which does not require normalization to obtain tint uniformity or powdering to prevent transfer mottling.

2. The process of claim 1 wherein the plastic sheeting is plasticized polyvinyl butyral.

References Cited

UNITED STATES PATENTS

| 2,593,405 | 4/1952 | Beckham | 156—100 |
| 2,697,053 | 12/1954 | Stanatoff | 161—199 |
| 2,739,080 | 3/1956 | Woodworth | 117—38 |
| 2,914,373 | 1/1956 | Rieser | 156—100 |
| 3,441,361 | 4/1969 | Tocatlian | |

ALFRED L. LEAVITT, Primary Examiner

M. F. ESPOSITO, Assistant Examiner

U.S. Cl. X.R.

8—4; 117—38, 68, 138.8; 156—100, 106; 161—194